United States Patent [19]
Palmer et al.

[11] Patent Number: 5,465,134
[45] Date of Patent: Nov. 7, 1995

[54] PASSIVE FILM TAKE-UP CHAMBER

[75] Inventors: Joseph P. Palmer, Batavia; Robert S. Jones, Rochester, both of N.Y.

[73] Assignee: Eastman Kodak Company, Rochester, N.Y.

[21] Appl. No.: 197,777

[22] Filed: Feb. 16, 1994

[51] Int. Cl.$^6$ .................................................. B03B 1/00
[52] U.S. Cl. ........................... 355/75; 242/348; 348/266
[58] Field of Search ........................... 242/348, 348.1, 242/348.3, 348.4; 348/266; 355/75

[56] References Cited

U.S. PATENT DOCUMENTS

| | | | |
|---|---|---|---|
| 3,057,573 | 10/1962 | Kindig et al. | 242/71 |
| 3,700,188 | 10/1972 | Bradford et al. | 242/194 |
| 3,810,588 | 5/1974 | Mahoney | 242/55 |
| 3,829,203 | 8/1974 | Novak | 352/78 R |
| 3,900,169 | 8/1975 | Robertson | 242/194 |
| 4,012,004 | 3/1977 | Tonellato | 242/55.19 R |
| 5,012,346 | 4/1991 | DeJager et al. | 358/214 |
| 5,083,155 | 1/1992 | Katoaka et al. | 355/75 |
| 5,162,840 | 11/1992 | Benker et al. | 355/32 |
| 5,328,032 | 7/1994 | Gedalovitz | 355/75 |
| 5,335,873 | 8/1994 | Harris et al. | 242/348 |

*Primary Examiner*—Michael L. Gellner
*Assistant Examiner*—Daniel P. Malley
*Attorney, Agent, or Firm*—David M. Woods

[57] ABSTRACT

A passive take-up chamber for temporarily receiving and storing photographic filmstrips in the transport path of a film scanner for digitizing images on the filmstrips. The take-up chamber has a cavity defined by parallel side walls and a generally circular, lateral connecting wall with a plurality of shaped interior surface segments formed in and spaced apart around the interior surface of the lateral wall and generally defining a circular path for the filmstrip within the cavity. A further plurality of guiding rollers are mounted to extend between the first and second side walls adjacent to the interior surface of the lateral wall, for rotation on contact with the longitudinal edges of the filmstrip. The further plurality of guiding rollers are interspersed between the plurality of shaped interior surface segments, so that the shaped interior surface segments guide the longitudinal edges of the filmstrip tangentially onto the guiding rollers, and the guiding rollers rotate to decrease friction of contact of the longitudinal filmstrip edges with the shaped interior surface segments. The take-up chamber is preferably attached fixedly to the translation stage of the film scanner for receiving a filmstrip during a first pass, low resolution scanning and digitizing of the image frames. The filmstrip is withdrawn from the chamber during a second pass, high resolution scanning and digitizing of the image frames. The fixed attachment allows the segment of the filmstrip within the chamber cavity to remain stationary during translation of the image frame thereof past the scanning gate.

14 Claims, 6 Drawing Sheets

PASSIVE FILM TAKE-UP CHAMBER

CROSS REFERENCE TO RELATED APPLICATION

Reference is made to U.S. patent application Ser. No. 167,643 filed on Dec. 14, 1993, and entitled "Film Clamp For Flattening Image Frames in a Scanning Gate"; (Ser. No. 197,775) filed Feb. 16, 1994 and entitled "Light Integrating Cavity for a Film Scanner"; (Ser. No. 197,774) filed Feb. 16, 1994 and entitled "Film Latent Image Bar Code (LIBC) Reader"; (Ser. No. 197,778) filed Feb. 16, 1994 and entitled "Film Positioning Method and Apparatus"; and (Ser. No. 201,282), filed on Feb. 16, 1994, and entitled "Film Scanner With In-Line Dual Scanning Gates".

FIELD OF THE INVENTION

The present invention relates to a passive take-up chamber for elongated flexible media and more particularly to such a chamber for use in temporarily receiving and storing photographic filmstrips in the transport path of a film scanner for digitizing images on the filmstrips.

BACKGROUND OF THE INVENTION

Conversion of analog images into digital data has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, the image frame is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346.

In order to perform line scanning of an image frame of photographic filmstrips, it is necessary to provide an accurate film transport mechanism to transport a filmstrip into a scanning gate and hold the image frame flat in alignment with a scanning aperture. Typically, the linear CCD array and scanning light beam are stationary so that the light beam illuminates a line of the filmstrip image frame, and a line of digitized data is stored. The scanning gate is incrementally moved line-by-line until the entire image frame is digitized. Then a new image frame is positioned and flattened for scanning and digitizing. Such a scanning and digitizing system for Photo-CD conversion is embodied in the KODAK® PIW Model 2400 Photo-CD scanner system marketed by the assignee of this application.

In this film scanner, the scanning plane is vertical and the stationary scanner components are oriented horizontally. A translation stage advances the film scanning gate past the stationary scanner components in a first pass for scanning the clamped image frame at a low resolution sufficient to provide a video display of the image frame on a monitor for viewing by the operator. The color balance of the scanned and digitized image pixel data is automatically adjusted to the color balance characteristics of the video display. The operator may further adjust the displayed color balance or tone and intensity of the color display while viewing the result of the adjustments until satisfied, whereupon the adjustment factors for that image frame are stored. The orientation of the image may also be stored with the digitized data so that the CD player can rotate the image data 90° for display as a video image at the same aspect that the image was captured by the photographer.

As each image frame is scanned in this first pass, the scanned image frames of the vertically oriented filmstrip are advanced into a stationary take-up chamber. The take-up chamber is provided within the scanner to temporarily hold the filmstrip and isolate it from other apparatus that it could catch on and to keep it clean. After all image frames are scanned, the trailing end of the filmstrip is retracted from the chamber and advanced in the reverse direction into the scanning gate one frame at a time. Then each image frame is scanned at high resolution for digitizing the image as a field of data associated to the data derived in the low resolution scan of the same image frame. The filmstrip is transported out the exit of the translation stage for removal by the operator when scanning of all frames is completed.

The relatively large, hollow, circular, take-up chamber has no moving parts and is fixed in position in the transport path with a film receiving slot positioned adjacent to an end of the translation stage. The filmstrip entering its slot is advanced and retracted during and between each scanning cycle through the movement of the translation stage. This movement can cause foreign particles, e.g. dust, to enter the chamber.

Within the interior cavity of the take-up chamber, the filmstrip is unrestrained and coils up against itself and the chamber walls. Since the filmstrip can tangle or catch in restricted spaces, e.g. the slot, friction may be introduced in the transport path that affects the proper centering of the image frame in respect to the scanning aperture and flattening of the image frame during the incremental operation of the translation stage. The filmstrip could also be scratched or damaged when being pulled into or out of the chamber slot. The chamber is sized relatively large in order to minimize the binding and scratching of the filmstrip.

Problems to be Solved by the Invention—Accordingly, there is a need for a take-up chamber that is compact in order to take up less space and minimizes the possibility of filmstrip jamming, binding, scratching or contamination.

SUMMARY OF THE INVENTION

Accordingly, it is an object of the present invention to provide a filmstrip take-up chamber for a film scanner that is compact and moves with the translation of the filmstrip image frame during scanning so that the entrance slot size may be reduced and the filmstrip does not move into and out of the entrance slot during translation of the image frames during scanning.

It is a further object of the invention to provide a filmstrip take-up chamber that is compact and provides guidance for the filmstrip in a constrained path that lessens friction against the filmstrip during its introduction into and withdrawal from the chamber.

These and other objects of the invention are realized in a take-up chamber in accordance with the invention for receiving an elongated filmstrip having a predetermined width between the longitudinal edges thereof that comprises a chamber housing for enclosing a filmstrip within the chamber, the housing having first and second side walls spaced apart to accommodate the width of the filmstrip, a lateral wall extending between the first and second side walls, a slit extending through the lateral wall and between the first and second side walls through which the filmstrip may be introduced or withdrawn from the chamber, and guiding means supported within the chamber housing for guiding the filmstrip by contact with its longitudinal edges into a path in proximity to the lateral wall so that the filmstrip is wound upon the guiding means in a roll as it is advanced into the slit and winds around the guiding means along the lateral wall.

The guiding means preferably further comprise a plurality of ramp shaped interior surface segments formed in and spaced apart around the lateral wall that are contacted by the leading end of the filmstrip as it is introduced. A further plurality of guiding rollers are mounted to extend between the first and second side walls adjacent to the shaped segments for rotation on contact with the longitudinal edges of the filmstrip. The further plurality of guiding rollers are preferably interspersed between the plurality of shaped interior surface segments, so that the shaped interior surface segments guide the longitudinal edges of the filmstrip into tangential contact with adjacent ones of the guiding rollers. The guiding rollers rotate to decrease friction of contact of the longitudinal filmstrip edges with the shaped interior surface segments. The interspersed shaped segments and guiding rollers thereby urge the filmstrip into a circular coil along the lateral wall within the chamber.

The slit is preferably oriented to present the leading end of the filmstrip into contact with a shaped segment to deflect transversely curled film and to present the longitudinal edges of the leading end of the filmstrip segment into contact with an adjacent guiding roller as it is introduced into the chamber.

In one embodiment, the path of the leading end of the filmstrip is also restrained from coiling toward the center of the cavity on insertion through the slit by a pair of internally disposed lobes extending from the interior surfaces of the first and second side walls toward one another. The lobes are preferably not circular and make contact on the longitudinal edges of the filmstrip as it is introduced for guiding it into tangential orientation to the lateral side wall segments and guide rollers. Moreover, the lobes are designed to prevent the elongated filmstrip from binding on itself as it is withdrawn from the chamber.

In a second embodiment, an internally disposed, rotatable spool extends between the first and second side walls and turns freely if the filmstrip coil tightens and the innermost coil bears against it on withdrawal from the slit. The rotatable spool in the cavity also provides a narrowed passage for the filmstrip to deflect the leading end of the filmstrip into tangential contact with the guiding rollers after it enters through the slit.

In operation, during introduction, the leading end of the filmstrip is inserted through the slit and its longitudinal edges contact the exposed ends of the first guiding roller which rotates and deflects the filmstrip leading end onto a first curved interior surface segment. As the leading end of the filmstrip advances, the longitudinal side edges of the filmstrip successively come into contact with the exposed ends of the guiding rollers and the interspersed curved interior surface segments and the filmstrip coils back upon itself. The remaining length of the filmstrip may be advanced through the slit to coil up with the outermost coil bearing upon the rollers and segments. Upon withdrawal, the film roll may tend to tighten or be displaced so that its innermost coil surface bears on the interiorly disposed lobes or on the inner roller which can rotate to allow the withdrawal to continue without friction.

In accordance with a further aspect of the invention, a filmstrip take-up chamber is provided with a filmstrip translation stage for a film scanner, where the chamber is associated with the translation stage for movement with it during line by line scanning of an image frame. In this aspect, the take-up chamber may be formed and operate as described above.

Advantageous Effects of the Invention—The take-up chamber of the invention is advantageously compact and takes up little room within the housing for the film scanner and digitizer and may also be mounted to move with the translation stage of the scanner gate. Moreover, it operates passively, with no powered parts. The interior configuration of the chamber employing the under cut rollers and the ramped surfaces self aligns entering filmstrips and lowers friction and attendant insertion and removal force and does not damage the filmstrip. The take-up chamber accommodates a wide variation in filmstrip length and accommodates severely curled filmstrips without jamming on insertion and withdrawal.

BRIEF DESCRIPTION OF THE DRAWINGS

Other objects, advantages and features of the present invention will become apparent from the following specification when taken in conjunction with the accompanying drawings in which like elements are commonly enumerated and in which.

DETAILED DESCRIPTION OF THE PREFERRED EMBODIMENTS

The drawings depict the construction and operation of the preferred embodiments of the filmstrip take-up chamber 10, 100 of the present invention for receiving the elongated filmstrip 12 transported into and out of the chambers 10, 100 by a transport mechanism (not shown) in the manner described in the above-referenced co-pending applications. A slide and filmstrip transport system is described in the above-referenced (Ser. No. 201,282) application employing a negative filmstrip scanning gate and a slide scanning gate that may be alternately positioned in the scanning station. The film scanner includes an input/output slot for introducing the slides into and from a slide scanning gate on a movable scanning gate frame.

Negative filmstrips are introduced in an input slot and pre-positioned in a filmstrip transport and LIBC reader assembly until scanning of a preceding filmstrip is completed and the preceding filmstrip is ejected from the filmstrip output slot. Then, the pre-positioned filmstrip is advanced by roller drive assemblies in a forward direction through the negative filmstrip scanning gate during pre-scanning, and into the filmstrip take-up chamber of the present invention. After pre-scanning is complete, the negative filmstrip is advanced back through the filmstrip scanning gate an image frame at a time, clamped in the gate and main-scanned. As each image frame is main-scanned, the filmstrip is advanced out the output slot. During main-scanning, the next filmstrip may be pre-positioned in the transport and LIBC reader assembly for scanning.

The respective scanning gates that are mounted at different points on an elongated negative filmstrip scanning gate frame coupled to a movable carriage. The carriage and scanning gate frame are driven in the forward or reverse directions on a track by a carriage drive motor for alternately positioning the respective scanning gate into the scanning station for the film type to be scanned. The carriage and scanning gate frame are also advanced during the main-scan of the image frames in the scanning gates positioned in the scanning station.

The film scanning gates position the respective image frames in alignment with a film scanning plane to minimize re-focusing on the image frame plane. The film scanner is further described in the above-referenced applications, particularly the above-referenced (Ser. No. 201,281) application.

Figure 2:
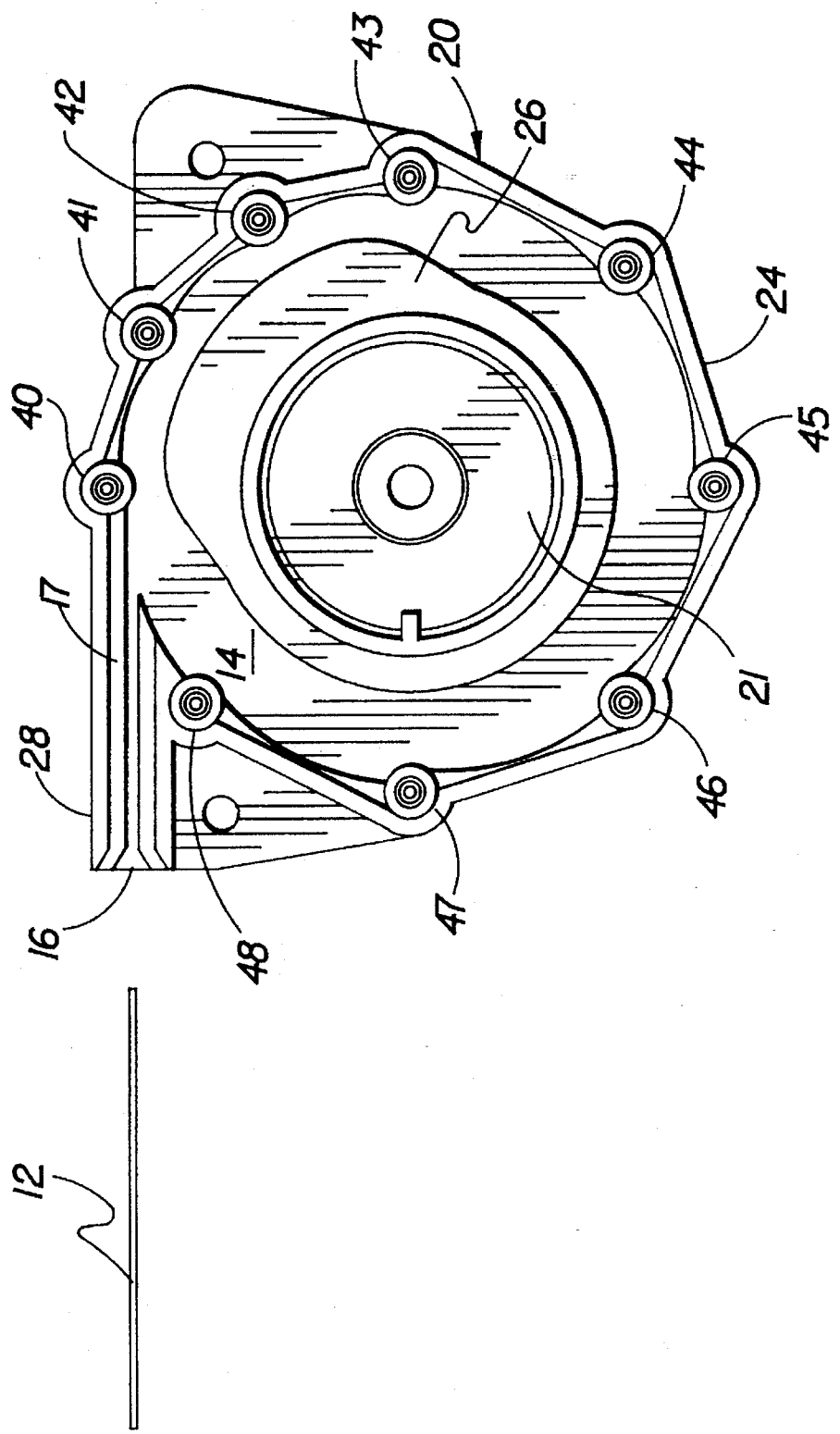
FIG. 2 is a side view of a half housing of the take-up chamber of FIG. 1 with rollers in place and with a filmstrip positioned to be advanced into the slit of the take-up chamber.
Figure 3:
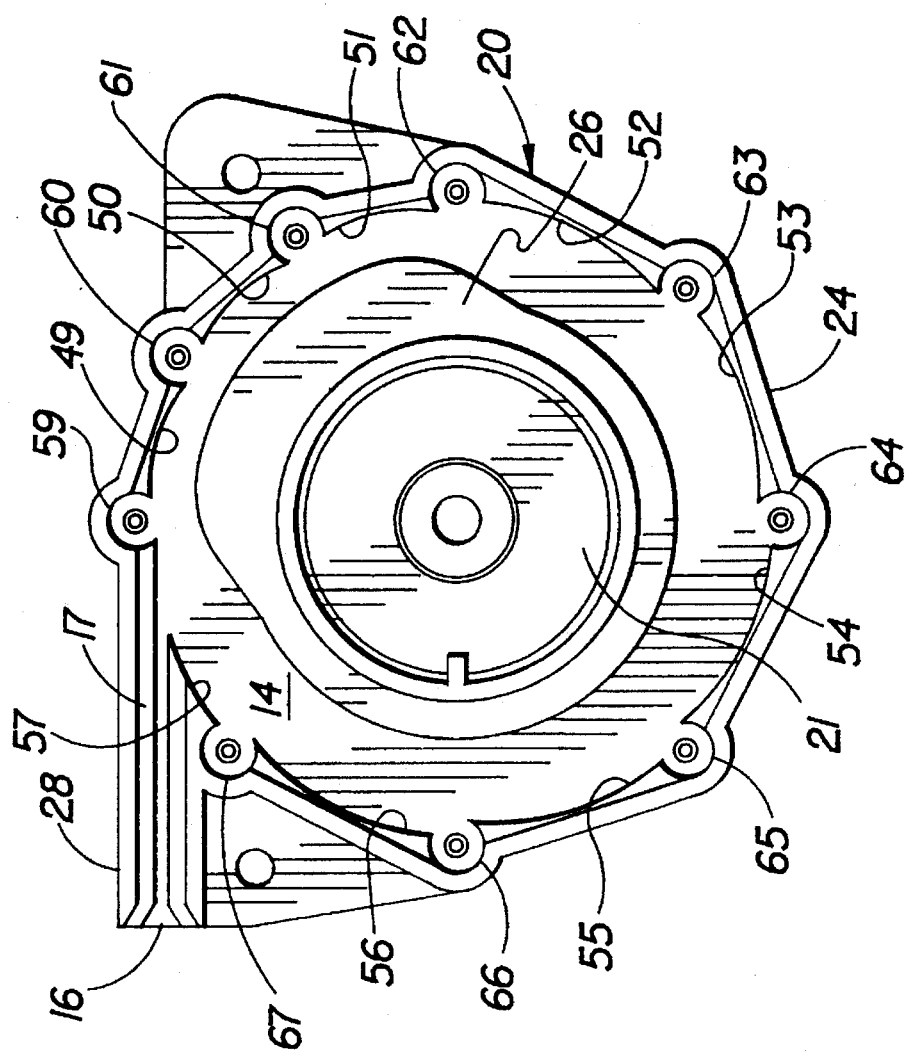
FIG. 3 is a side view of the same half housing of FIG. 2 with the rollers removed.
Figure 4:
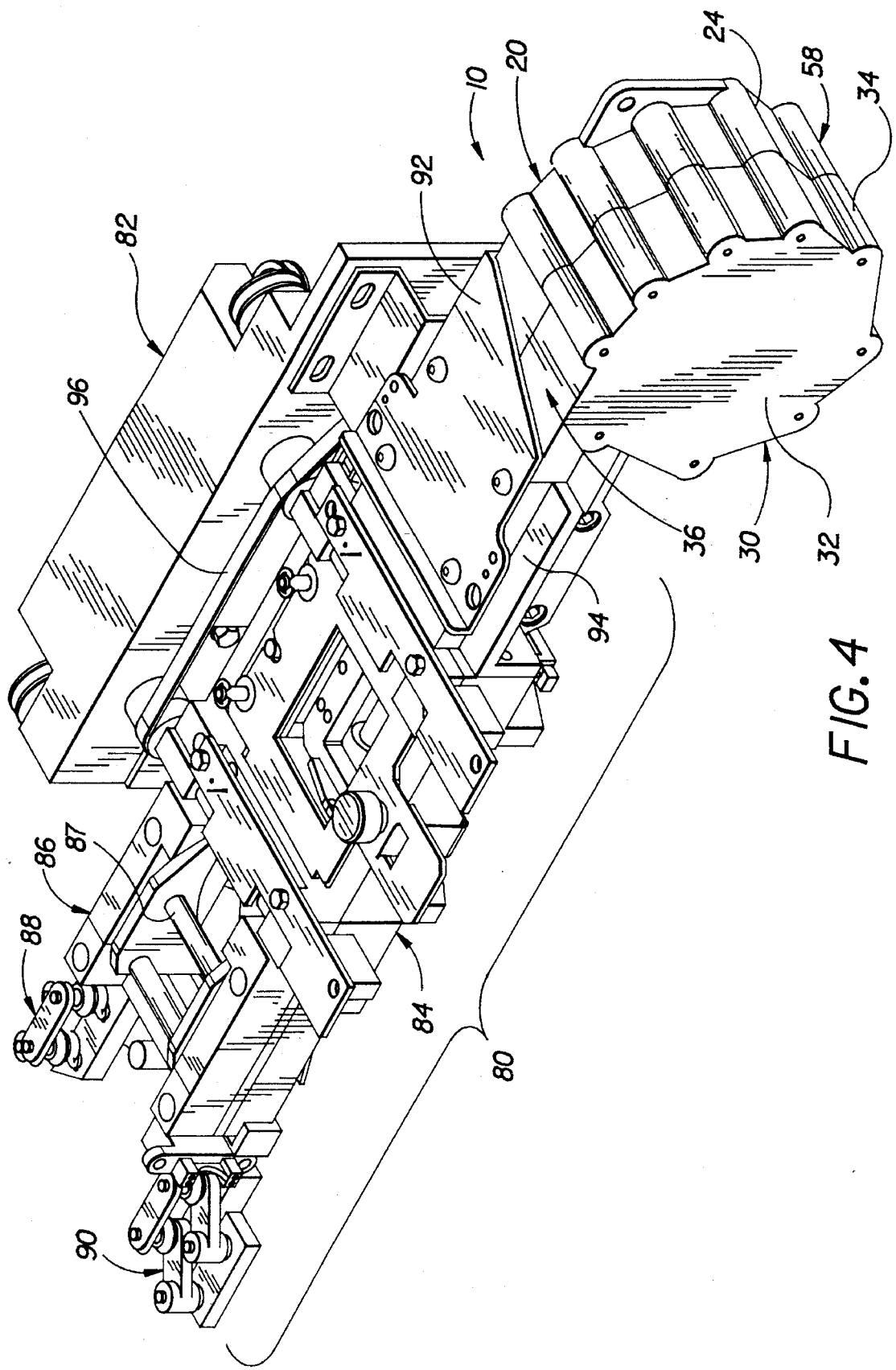
FIG. 4 is a perspective view of the scanning gate and translation stage of a film scanner and digitizer with the take-up chamber of FIGS. 1–3 affixed thereto.

In reference first to the embodiment of FIGS. 1–4, the take-up chamber 10 is formed of first and second housing halves 20 and 30 which support outer rollers 40, 41, 42, 43, 44, 45, 46, 47, and 48 arranged about the lateral wall 58 formed by the attachment of lateral half wall portions 24 and 34. The halves 20 and 30 also include a fixed, inner, circular spool which is formed of two half spools, e.g. half spool 21 depicted in the exploded view of FIG. 1 and the half housing views of FIGS. 2 and 3. When assembled, the take-up chamber 10 provides a frictionless, non-binding inner cavity 14 between the lateral wall 58 and the spool for receiving and rolling the elongated filmstrip 12 into a film roll of one or more coils. The filmstrip take-up chamber 10 is attached to the translation stage and scanning gate frame 80 as depicted in FIG. 4 for movement with frame 80 during line by line scanning of an image frame of filmstrip 12.

Figure 1:
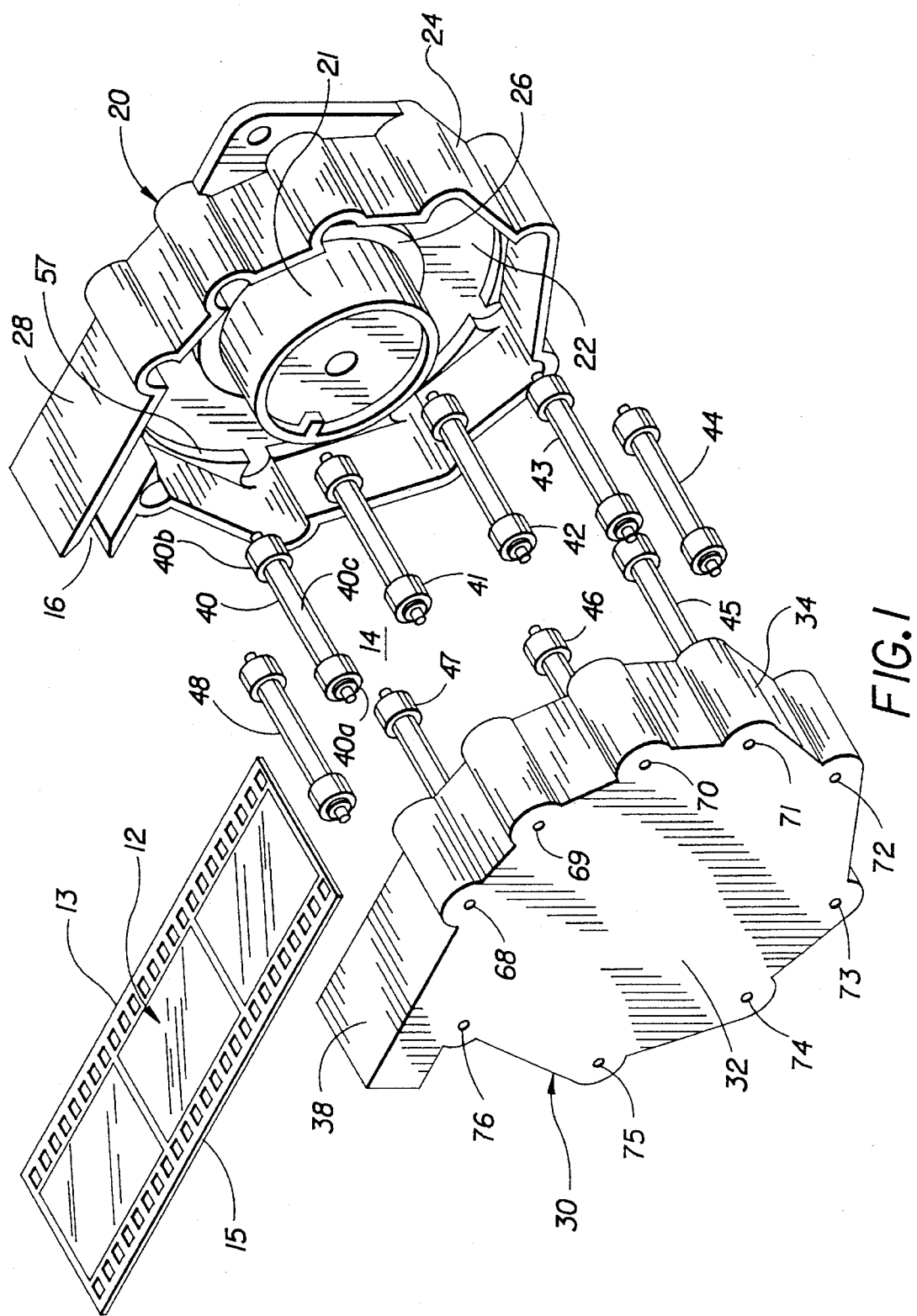
FIG. 1 is an isometric, exploded view of a first embodiment of a take-up chamber constructed in accordance with the invention.

In FIG. 1, it may be seen that the housing halves 20 and 30 have respective flat side walls 22 and 32 and half portions 24 and 34 of the generally circular lateral wall 58 formed when the housing halves are attached together. The housing halves 20 and 30 may be attached together by fasteners extending through holes in mating flanges to form the inner cavity 14 with the rollers 40–48 positioned in place as depicted in FIG. 3. Each of the rollers 40–48 are formed of a single metal rod machined to have small diameter end axles, first and second relatively large diameter end rollers and an under cut inner roller section of an intermediate diameter. The end axles fit into two matching sets of bores in the side walls 22 and 32, e.g. bores 68, 69, 70, 71, 72, 73, 74, 75 and 76 depicted in FIG. 1 in side wall 32, for allowing free rotation of the rollers 40–48 when assembled in the housing halves 20 and 30.

The housing halves 20 and 30 are also provided with flat extensions 28 and 38 which form a composite chamber extension 36 having an opening slit 16 in the end thereof. Slit 16 is positioned to the film transport path for receiving the leading end to the filmstrip 10 and directing it tangentially through an elongated slot 17 into the cavity 14 so that the leading end bears first against roller 40. The slot 17 is wide enough to accommodate the most popular 35 mm filmstrips and may be formed with edge guides that narrow the slot thickness at the filmstrip edges 13 and 15.

The lateral wall half portions 24 and 34 are each shaped to present a plurality of ramp shaped interior surface segments, numbered in housing half 20 in FIG. 3 as segments 49, 50, 51, 52, 53, 54, 55, 56 and 57. It will be understood that the same set of segments are formed in the same places in mirror image in the lateral half wall portion 34 of second housing half 30. Each set of such segments 49–57 are interspersed between and form parts of two sets of cylindrical receptacles for the rollers 40–48. One set of the receptacles 59, 60, 61, 62, 63, 64, 65, 66 and 67 are shown in the housing half 20 in FIG. 3, and the other set will be understood to be formed in the lateral half wall portion 34. The rollers 40–48 have axles that fit into the axle holes in each of the flat side walls 22 and 32 in the cylindrical receptacles 59–67 in the pattern depicted in FIGS. 1–3. The rollers 40–48 are shown in FIG. 2 positioned in the receptacles 59–67 of lateral half wall portion 24.

Each of the rollers 40–48 is under cut as shown in FIG. 1 so as to present a pair of end roller surfaces in short sections at each end thereof, e.g. end sections 40a and 40b of roller 40, that are larger in diameter than the intermediate section of each roller, e.g. section 40c. The larger diameter end sections of each roller 40–48 are intended to make contact with the edges 13 and 15 of the filmstrip 12 as it is introduced through the slit 16, and advanced through slot 17 and formed into a film roll in the cavity 14. Thus, as shown in FIG. 3, the end roller sections are of a great enough diameter to slightly protrude out of the cylindrical receptacles 59–67 beyond the adjoining edges of the shaped segments 49–57 to make tangential contact with the longitudinal edges 13 and 15 of the filmstrip 12.

It should be noted that the ramp shaped interior surface segments 49–57 denoted in FIG. 3 formed in both lateral half wall portions 24 and 34 are about the same width as the roller end section surfaces, as shown particularly at the surface segment 57 in FIG. 1. This width of each set of the segments 49–57 corresponding to the width of each end section roller surface allows for the introduction and withdrawal of filmstrips evidencing severe lateral curling without making contact with and possibly scratching the inner image frames.

Referring again to FIGS. 2 and 3, provision is also made to limit the movement of the filmstrip 12 into the center of take-up chamber 10 and to force it into contact with the rollers 40–48. In this regard, a pair of internally disposed, eccentric shaped, lobes extend from the interior surfaces of the first and second side walls 22 and 32 toward one another in a mirror image pattern. The lobe 26 in side wall 22 is depicted in FIGS. 1–3, and it will be understood that a mirror image of lobe 26 is present in the side wall 32 so that the aligned lobes create an eccentric path in cavity 14 for controlling lateral movement of the filmstrip 12. In this regard, the lobes have lateral surfaces of the same width as the end roller sections, e.g. 40a, 40b, for making contact on the longitudinal edges 13 and 15 of the filmstrip 12. The lobes define a narrowed path of travel of the filmstrip in the cavity 14 tangential to rollers 40, 41 and 42 to prevent jamming of the filmstrip leading end into the junction between these rollers and their receptacles 59, 60, 61.

Thus, when rollers 40–48 and housing halves 20 and 30 are assembled, the take-up chamber 10 provides a cavity 14 for receiving the filmstrip 12 in a film roll of a number of coils depending on the length of the filmstrip 12. The leading end of the filmstrip 12 is inserted through the slit 16 and its longitudinal edges 13, 15 contact the exposed end roller section surfaces of the first guiding roller 40 which rotates and deflects the leading end onto first curved interior surface segment(s) 49. As the leading end of the filmstrip 12 advances, its longitudinal side edges 13, 15 successively come into contact with the exposed end roller section surfaces of the under cut guide rollers 40–48 and the interspersed curved interior surface segments, and the filmstrip 12 coils back upon itself. The remaining length of the filmstrip 12 may be advanced through the slot 17 to roll up with the outermost coil bearing upon the rollers and segments.

Upon withdrawal, the filmstrip roll may tend to tighten or be displaced so that its innermost coil surface bears on the surfaces of the lobes, e.g. lobe 26. The eccentric patterns of the lobes aids in preventing the coil surfaces from binding against one another.

In accordance with a further aspect of the invention relating to the use made of the take-up chamber 10, chamber 10 is depicted in FIG. 4 mounted in the filmstrip transport path of a filmstrip translation stage and scanning gate frame 80 for movement with frame 80 during line-by-line scanning of an image frame of filmstrip 12.

The scanning gate frame 80 supports left and right side slide scanning gate adjusting links 88, 90 attached at the left end thereof. Links 88, 90 support the movable jaws of the slide scanning gate (not shown). The negative filmstrip (not shown) is guided into the film clamp and scanning gate assembly 84 by a film transport assembly (not shown) over a diverter assembly 86 including a flipper 87 that is depressed to a down position by the advancement of the leading end of the filmstrip. The flipper 87 returns to its normal up position when the trailing end of the filmstrip passes into the film clamp and scanning gate assembly 84. The up flipper allows the ejection of the filmstrip through a separate ejection pathas the high resolution scanning of the image frames is conducted. These details of the film scanner are not believed to be necessary to the understanding of the present invention but may be found in the above-referenced applications, particularly the (Ser. No. 201,282) application.

The filmstrip take-up chamber 10 is attached at the other side of the film clamp and scanning gate assembly 84 by clamp assembly 92 so that the slit 16 is aligned with the filmstrip transport path. The clamp assembly 92 fits around the composite chamber extension 36 formed by flat extensions 25, 35 and is fastened to a flange 94 extending in parallel with the filmstrip transport path.

The scanning gate frame 80 is supported by translation carriage 82. Carriage 82 is movable on a track (not shown) under the control of the carriage drive motor (not shown) to either position the slide scanning gate or the film clamp and scanning gate assembly 84 into the scanning position. The take-up chamber 10 of the present invention is only used in the scanning of elongated filmstrips having two or more image frames.

Assuming that a negative filmstrip is to be scanned, the carriage 82 translates until the film clamp and scanning gate assembly 84 are positioned in the scanning station and the film clamp is released to allow the filmstrip to be advanced past the scanning aperture. The negative filmstrip leading end is advanced from above over the depressed flipper 87 and into the nip if a first drive roller assembly (obscured by other components) driven by a film transport motor (not shown) in the carriage 82 through the drive belt 96 and at the left side of the film clamp and scanning gate assembly 84. The filmstrip is then advanced to the right through the scanning aperture by the first drive roller assembly and into the nip of a second drive roller assembly on the other side of the scanning aperture that is also driven through drive belt 96.

The filmstrip leading end is continuously driven at relatively high speed through the scanning aperture by the first and second drive roller assemblies, and a low resolution pre-scan opertion is conducted as described above and in the above-referenced co-pending applications. At the same time, position data is derived by sprocket hole perforation sensors for use in the detection of drive slippage or jamming and the correct positioning of the image frames during the high resolution main-scan operation of the image frames in the reverse direction. As this proceeds, the filmstrip is loaded into the attached take-up chamber 10 until the last image frame is pre-scanned. Rotation of the drive roller assemblies through drive belt 96 is halted with the trailing end of the filmstrip engaged in the nip of the right side drive roller assembly.

After all image frames are pre-scanned, rotation of the drive roller assemblies is reversed, and the filmstrip is driven to the left until an image frame is positioned in the scanning aperture using the positioning data accumulated in the pre-scan. Once the filmstrip image frame is positioned for scanning, the drive belt 96 is halted and the film clamp is engaged. The carriage 82 is then incrementally driven to translate the clamped film image frame past the stationary scanning components to derive the high resolution main-scan image data. During that translation and scanning, the negative filmstrip is itself motionless in the scanning gate 84, and the image frames to be withdrawn and scanned next are motionless inside the take-up chamber 10. The process is repeated to complete the main-scan of each image frame, and the filmstrip is diverted below the flipper 87 out the exit path of the film scanner.

All of the components depicted in FIG. 4 are fixed for movement together, so that the driven carriage 82 can provide the above described translation movement during high resolution line-by-line scanning of the image frame in the scanning aperture. Since the take-up chamber 10 also moves during translation, the filmstrip 12 remains stationary between the film clamp and scanning gate assembly 84 and the take-up chamber 10, avoiding any binding or movement of dust particles into the cavity 14 that could take place if the filmstrip 12 were to move relative to chamber 10.

Figure 5:
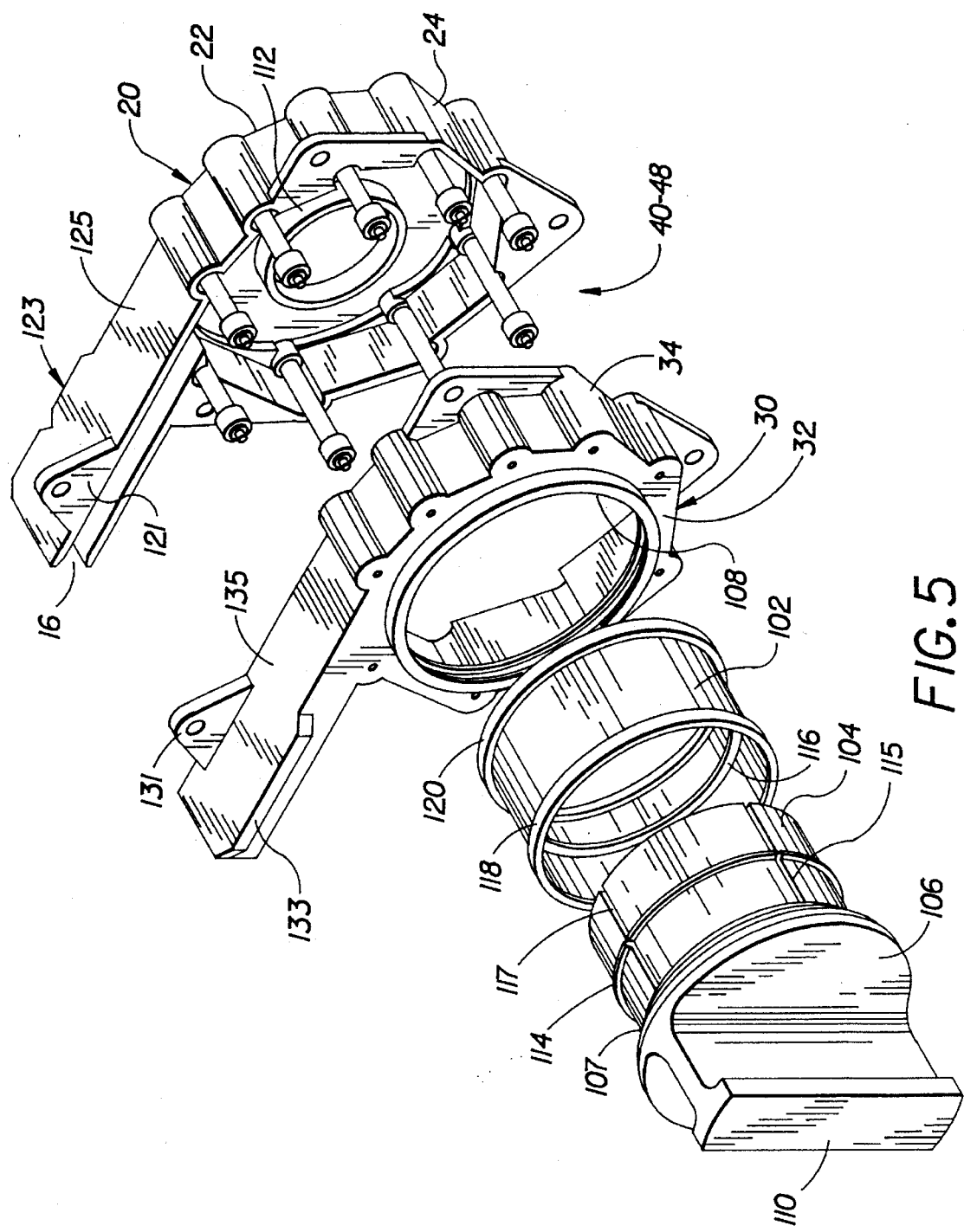
FIG. 5 is an isometric, exploded view of a second embodiment of a take-up chamber constructed in accordance with the invention.
Figure 6:
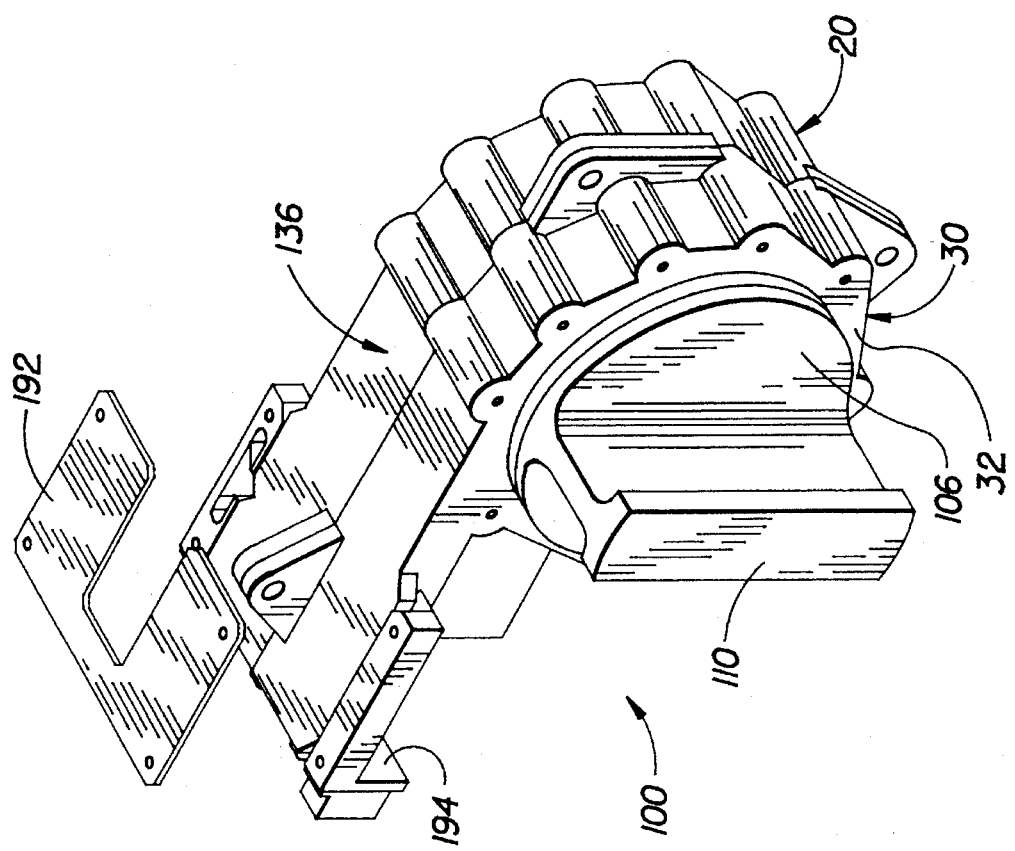
FIG. 6 is a perspective view of the take-up chamber of FIG. 5 in relation to the mounting plates of a translation stage of the type depicted in FIG. 4.

Turning now to the second embodiment of the take-up chamber 100 of FIGS. 5 and 6, this take-up chamber 100 differs from the first embodiment take-up chamber 10 primarily in that the lobes, e.g. depicted lobe 26, of the first embodiment are replaced by a rotating sleeve 102. Rotating sleeve 102 is supported for rotation on a bearing cylinder 104 attached to cap 106 and projecting interiorly into the cavity of the take-up chamber 100. Cap 106 is threaded to mate the threads in bore 108 in side wall 32, so that it may be screwed off by rotating handle 110. The cap 106 allows the removal of the rotating sleeve 102 to expose the full interior of the chamber 100 to cleaning and to recover any filmstrip that has been inadvertently wound fully into the cavity 14.

The cylinder 104 is hollow, and its open end fits over the cylindrical ring 112 projecting inward from the other flat side wall 22 when the cap 106 is threaded on. The exterior surface of cylinder 104 is sectioned lengthwise so it can be compressed and reduced in diameter and is channeled with a circumferential groove 114 to mate with and receive a ring shaped rail 116 in the interior of rotating sleeve 102. The rail 116 rides in the groove 114 when rotating the sleeve 102.

The exterior surface of rotating sleeve 102 is enlarged in diameter at each end to form end surfaces 118, 120 that align to the enlarged end, roller section surfaces, e.g. 40a and 40b for roller 40. The rotating sleeve 102 and the cylinder 104 are centrally disposed within the cavity 14 leaving a narrow passage way between the interior components of the lateral wall 58 and sleeve 102. This encourages the leading end of a filmstrip 12 entering the cavity 14 into tangential alignment with the nearest guiding rollers and interspersed surface segments and avoids stubbing of the leading end against one of the rollers or roller receptacles.

The flat extensions 125 and 135 differ from extensions 25 and 35 of the first embodiment in their length and also have laterally extending flanges 123, 133 and upright flanges 121, 131. The upright flanges 121, 131 mate and are secured together with a fastener. The laterally extending flanges fit shoulders in the flange 194. The attachment of the composite chamber elongated extension 136 to the flange 194 is effected by fasteners extending through the plate 192 into bore holes in flange 194. Again, the take-up chamber 100 is attached to move with the film translation apparatus during forward and reverse scanning.

The second embodiment is constructed in the same fashion as the embodiment of FIG. 1 with respect to the placement and configuration of the rollers 40–48 and the ramp shaped surface segments 49–57. The filmstrip traverses the interior cavity 14 in the same fashion as described above.

The components of the film take-up chambers 10 and 100 may be fabricated of plastic and may be all or partly transparent. The rollers 40–48 may be fabricated of metal for durability and ease of rotating in the sets of bores 68–76. The rollers 40–48 may alternatively be configured with a single, uniform diameter and not under cut as depicted in the drawings and described above.

Although the film take-up chamber of the present invention has been described in the context of a film scanner, it will be appreciated that it or its techniques and features may be employed in whole or in part in takeup chambers for elongated film or other media for other applications, e.g. in photographic printers for making prints from negative filmstrips.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–6 first embodiment take-up chamber 10
filmstrip 12
longitudinal edges 13, 15
internal cavity 14
slit 16
slot 17
first housing half 20
inner spool 21
flat side wall 22
half wall portion 24
lobe 26
flat half extension 28
second housing half 30
flat side wall 32
half wall portion 34
composite chamber extension 36
flat half extension 38
outer rollers 40, 41, 42, 43, 44, 45, 46, 47, 48
end section roller sections 40a, 40b
intermediate section roller section 40c
shaped interior surface segments 49, 50, 51, 52, 53, 54, 55, 56, 57
lateral wall 58
cylindrical receptacles 59, 60, 61, 62, 63, 64, 65, 66, 67
bores 68, 69, 70, 71, 72, 73, 74, 75, 76
filmstrip translation stage and scanning gate assembly 80
translation drive unit 82
filmstrip clamp and scanning gate assembly 84
diverter assembly 86
flipper 87
slide scanning gate adjusting links 88, 90
clamping assembly 92
flange 94
drive belt 96
second embodiment, take-up chamber 100
rotating sleeve 102
bearing cylinder 104
cap 106
threads 107
bore 108
handle 110
cylindrical ring 112
circumferential groove 114
slot 115
ring shaped rail 116
slot 117
end surfaces 118, 120
upright flanges 121, 131
laterally extending flanges 123,133
flat extensions 125 and 135
composite chamber elongated extension 136
flange 194
plate 192

We claim:

1. A take-up chamber for receiving an elongated filmstrip having a predetermined width between the longitudinal edges thereof comprising:

a chamber housing for enclosing a filmstrip within the chamber, the housing having first and second side walls spaced apart to accommodate the width of the filmstrip, a lateral wall extending between the first and second side walls, and a slit extending through the lateral wall and between the first and second side walls through which the filmstrip may be introduced or withdrawn from the chamber; and guiding means comprising a plurality of ramp shaded interior surface segments and a plurality of guiding rollers supported within the chamber housing for guiding the filmstrip by contact with its longitudinal edges into a path in proximity to the lateral wall so that the filmstrip is wound upon the guiding means in a roll as it is advanced into the slit and winds against the guiding means along the lateral wall said plurality of guiding rollers being interspersed between said plurality of said shamed interior surface segments.

2. The take-up chamber of claim 1 wherein said plurality of shaped interior surface segments are formed in and spaced apart around said lateral wall and generally defining a circular path for the filmstrip within said chamber;

said plurality of guiding rollers are mounted to extend between said first and second side walls adjacent to the interior surface of said lateral wall for rotation on contact with the longitudinal edges of the filmstrip, said further plurality of guiding rollers preferably interspersed between said plurality of shaped interior surface segments, so that said shaped interior surface segments guide the longitudinal edges of the filmstrip onto said guiding rollers, and said guiding rollers rotate to decrease friction of contact of the longitudinal filmstrip edges with said shaped interior surface segments.

3. The take-up chamber of claim 2 wherein:

said slit is oriented to present the longitudinal edges of the leading end of the filmstrip into contact with a first one of said plurality of guiding rollers as it is introduced into the chamber.

4. The take-up chamber of claim 2 wherein:

said shaped interior surface segments are each formed in the interior surfaces of said side walls and shaped to guide said elongated edges of said filmstrip into tangential contact with adjacent ones of said guiding rollers.

5. The take-up chamber of claim 4 wherein:

said interspersed guiding rollers and shaped interior surface segments are arranged to define a generally circular take-up chamber cavity so that the filmstrip is coiled into a circular film roll bearing against said guiding rollers and said segments at the longitudinal edges thereof.

6. The take-up chamber of claim 4 further comprising:

first and second internally disposed lobes extending from the interior surfaces of said first and second side walls, respectively, toward one another for making contact on the longitudinal edges of the filmstrip and for guiding said filmstrip into tangential contact with adjacent guiding rollers.

7. The take-up chamber of claim 4 wherein:

said plurality of rollers are each formed with end surface sections having a first diameter dimensioned with respect to said plurality of shaped surface segments to project sufficiently with respect thereto to make tangential contact with the longitudinal edges of the filmstrip and an intermediate surface section having a reduced diameter from said first diameter to avoid contact with transversely bowed filmstrips.

8. The take-up chamber of claim 2 wherein:

said plurality of rollers are each formed with end surface sections having a first diameter dimensioned with respect to said plurality of shaped surface segments to project sufficiently with respect thereto to make tangential contact with the longitudinal edges of the filmstrip and an intermediate surface section having a reduced diameter from said first diameter to avoid contact with transversely bowed filmstrips.

9. The take-up chamber of claim 2 further comprising:

first and second internally disposed lobes extending from the interior surfaces of said first and second side walls, respectively, toward one another for making contact on the longitudinal edges of the filmstrip and for guiding said filmstrip into tangential contact with adjacent guiding rollers.

10. The take-up chamber of claim 1 further comprising:

an internally disposed cylindrical roller extending from the interior surfaces of said first and second side walls, respectively, toward one another for making contact and rotating with the inner-most coil of the film roll formed by the filmstrip as the filmstrip is withdrawn from the take-up chamber.

11. The take-up chamber of claim 2 further comprising:

an interiorly disposed, rotatable cylinder for extending between the interior surfaces of said first and second side walls having cylindrical surfaces for making contact on the longitudinal edges of the filmstrip and for guiding said filmstrip into tangential contact with adjacent guiding rollers.

12. The take-up chamber of claim 11 further comprising:

a removable cap formed in said first side wall for providing access to the interior of said film take-up chamber.

13. The take-up chamber of claim 12 further comprising:

an elongated bearing sleeve attached to said cap and extending laterally into the interior of said take-up chamber and configured to support said rotatable cylinder for rotating with respect to said sleeve.

14. The take-up chamber of claim 11 further comprising:

an elongated bearing sleeve extending laterally into the interior of said take-up chamber and configured to support said rotatable cylinder for rotating with respect to said sleeve.

* * * * *

UNITED STATES PATENT AND TRADEMARK OFFICE
CERTIFICATE OF CORRECTION

PATENT NO. : 5,465,134
DATED : November 7, 1995
INVENTOR(S) : Palmer et al.

It is certified that error appears in the above-indentified patent and that said Letters Patent is hereby corrected as shown below:

Column 5, line 27, delete "Ser. No. 201,281" and insert --Ser. No. 201,282--.

Column 7, line 38, delete "pathas" and insert --path as--.

Column 10, line 65, delete "shaded" and insert --shaped--

Column 11, line 7, delete "shamed" and insert --shaped--.

Signed and Sealed this

Twenty-fourth Day of December, 1996

*Attest:*

BRUCE LEHMAN

*Attesting Officer*  *Commissioner of Patents and Trademarks*